United States Patent [19]

Adams et al.

[11] Patent Number: 5,595,688
[45] Date of Patent: Jan. 21, 1997

[54] WATER SOLUBLE CAKING INHIBITORS FOR AMMONIUM PHOSPHATES

[75] Inventors: Mark A. Adams, Chesterfield; Robert V. Brill, St. Louis, both of Mo.; James R. Vass, Gibralter, Mich.

[73] Assignee: Monsanto Company, St. Louis, Mo.

[21] Appl. No.: 469,112

[22] Filed: Jun. 6, 1995

[51] Int. Cl.$^6$ .................................................. C09K 3/18
[52] U.S. Cl. .......................... 252/385; 71/64.12
[58] Field of Search .................... 252/383, 385; 71/64.12

[56] References Cited

U.S. PATENT DOCUMENTS 2,770,548  11/1956  Hall et al. .
3,354,092  11/1967  Perry .
5,286,272  2/1994  Biamonte et al. .

OTHER PUBLICATIONS

CS 204937B (1983) as abstracted by Chemical Abstract 100:88162.
SU 829119 (1979) as abstracted by Chemical Abstract 95:172048.
Phosphorus Potassium (1986), 86, pp. 45–47 Chem. Abstract 88:103959 only.
FR 2219803 (1974) Chem Abstract 83:12918 only.
NL 9102046 (1992) Chem. Abstract 118:6274 only.

Primary Examiner—Sharon Gibson
Assistant Examiner—Valerie Fee
Attorney, Agent, or Firm—Fitzpatrick, Cella, Harper & Scinto

[57] ABSTRACT

There is disclosed a class of inhibitors for mono- and diammonium phosphates which are water soluble and effective at small concentrations rendering the phosphates acceptable in most utilities without separation of the inhibitor. The class of inhibitors are water soluble alkali metal phosphate salts selected from sodium tripolyphosphate, sodium potassium tripolyphosphate, sodium acid pyrophosphate, sodium pyrophosphate, sodium hexametaphosphate, trisodium phosphate, disodium phosphate and monosodium phosphate. Effective amounts of these salts range from about 0.025 percent to about 0.3 percent by weight in the ammonium phosphates. It is particularly advantageous that these salts are useful in both types of ammonium phosphates.

20 Claims, No Drawings

WATER SOLUBLE CAKING INHIBITORS FOR AMMONIUM PHOSPHATES

BACKGROUND OF THE INVENTION

Ammonium phosphates have many utilities in industry including such technical uses as fertilizers fire proofing textiles, paper, wood, and vegetable fibers, impregnating lamp wicks, flux for soldering tin, copper, brass and zinc, hard surface cleaners, corrosion inhibitors and in forest fire retardants. They are also useful in food and dentifrice applications such as in purifying sugar, in yeast cultures, oral compositions and baking powder.

Monoammonium phosphate and diammonium phosphate (hereinafter referred to as ammonium phosphates) prepared from pure acids ($P_2O_5$/water derived from phosphorus burners) rather than from the wet acid process are particularly known for their tendency to cake severely and much effort is used to break up the cake upon delivery of the product. As can be seen from the above noted industrial uses, large amounts of monoammonium and diammonium phosphates are used and therefore shipping containers of large scale size are employed in the transport of these material. Caking is a particular disadvantage when there is presented the occasion of large amounts of these phosphates to cake into shapes of considerable size requiring so much effort as to affect the economics of their use.

Agents employed to inhibit caking of materials in the past have relied upon the property of hygroscopisity or the use of hygroscopic agents to at least minimize caking. Such materials included corn sugar or glycerine, sorbital and propylene glycol. These materials are noted in U.S. Pat. No. 2,770,548 to Hall et al. It is also noted in said patent that small or trace amounts of metal ions function as oxidation catalysts in nitrite converting it to the nitrate. The use of polyphosphate, such as sodium polyphosphate, was added to sequester the metal ions. However, as indicated in the above noted patent, the sequestration of the metal ions did not reduce the tendency of the nitrites to cake. The above noted Hall patent teaches that the hygroscopic caking inhibitor for meat-curing compositions is improved with the addition of an alkaline alkali metal orthophosphate such as trisodium or disodium phosphate or the potassium analogs. Such orthophosphates were employed in the range of from 2% to 5% by weight. However the meat treating compositions disclosed by this patent did not contain any ammonium phosphates.

Various phosphate salts are well know for their utility in detergents. A composition containing monoammonium or diammonium phosphate as a cleaning agent is disclosed in U.S. Pat. No. 3,354,092 to Perry wherein orthophosphates and tripolyphosphates were included for their detergency effect. No caking inhibition was attributed to these salts and they were employed in amounts to provide active cleaning effect ranging from 40% to 97% of the composition while the ammonium phosphates represented only about 0% to about 34% of the composition.

More recently there has been disclosed a water soluble potassium phosphate caking inhibitor for fertilizer compositions in U.S. Pat. No. 5,286,272 to Biamonte et al. More particularly, tripotassium phosphate, which is highly water soluble and hygroscopic, was employed in as little as 0.25% up to 5%, by weight, in fertilizer compositions containing amounts of monoammonium and diammonium phosphates in the range of from 16% to 32% along with major amounts of nitrates such as ammonium and potassium nitrates or urea. It has been found that caking tendency increases as the ammonium moeity of the phosphate increases. In large industrial production of ammonium phosphates it is important that the same caking inhibitor can be employed for either monoammonium phosphate or the more severely affected diammonium phosphate. Water solubility is important for most uses of the ammonium phosphates and the use of insoluble caking inhibitors leave undesirable precipitates. Previously water soluble caking inhibitor of adequate activity to be employed in small amounts were unknown for use in monoammonium and diammonium phosphate compositions. There is a need for highly active water soluble caking inhibitors for use in large quantities of monoammonium and diammonium phosphates thereby improving the economics in the use of these materials.

SUMMARY OF THE INVENTION

In accordance with this invention there is provided monoammonium and diammonium phosphate compositions of reduced caking tendency which comprise said phosphate and a caking inhibiting amount of a water soluble alkali metal phosphate salt selected from the group consisting of sodium tripolyphosphate, sodium potassium tripolyphosphate, sodium acid pyrophosphate, sodium pyrophosphate, sodium hexametaphosphate, trisodium phosphate, disodium phosphate and monosodium phosphate. Typically, the above noted alkali metal phosphates are employed in amounts within the range of at least about 0.025%, by weight, and typically not more than about 0.3%, by weight, although higher amounts can be employed in those cases wherein the assay of the product is specified as being somewhat less than 99%, by weight. Typically, monoammonium phosphate and diammonium phosphate are sold in concentrations in excess of 90% by weight.

DETAILED DESCRIPTION OF THE INVENTION

Although the caking inhibitors of this invention may be employed in ammonium phosphates from any source, they are particularly efficacious in ammonium phosphates derived from phosphoric acid prepared from burning phosphorus to provide a $P_2O_5$/water solution. Such ammonium phosphates are particularly prone to cake formation. One of the features of this invention is to provide a single caking inhibitor for both monoammonium phosphate and diammonium phosphate although it has been observed that the ability of some agents to reduce the caking tendency of monoammonium phosphate does not necessarily indicate a similar property in diammonium phosphate.

As noted above the alkali metal salts of various phosphates are useful as caking inhibitors in accordance with this invention. However, it has been found that only the sodium salt is generally useful while the potassium salts have only limited utility, actually only as a mixed salt with sodium in a polyphosphate. In practice, it is preferred that the phosphate salts are utilized in the powder form. Typically, the particle size of the phosphate powders are in the range of from about 50 to about 100 microns and usually about 75 microns (200 mesh). The preferred phosphate salt of this invention is monosodium orthophosphate because of its effectiveness in small amounts as well as being highly soluble in water.

The powdered phosphate salt is thoroughly mixed with the ammonium phosphates in typical mixing apparatus such as vibrators, mixers, tumbler and the like. It is obviously necessary to achieve uniform admixture since the cake forming inhibitors of this invention are employed in very small amounts.

DESCRIPTION OF THE PREFERRED EMBODIMENTS

EXAMPLE 1

In the following tests 2 kg. samples of monoammonium phosphate were taken from 22.68 kg. or 45 kg. bags of product within one day of manufacture. The sample was then mixed with the caking inhibitor candidate by placing the candidate and the ammonium phosphate into a polyethylene tub. The mixture was then agitated by shaking the tub vigorously. After mixing, the contents of the tub were placed into polyethylene bags which were then closed with plastic ties. The bags were placed on pallets in one layer stored at ambient plant temperature and humidity for a period of 5 weeks. In most instances, duplicate samples were prepared and the test score averaged. The data obtained in the test appears in Table I below. When data is obtained from more or less than duplicate samples, the number of samples actually tested is noted as a superscript after the average score. After storage, the bags were examined to determine the extent of caking. The extent of caking tendency was rated by a numerical scoring system as follows:

| Score | Condition |
|---|---|
| 0 | completely free flowing with no lumps |
| 0.5 | completely free flowing some soft lumps |
| 1 | completely set and easily broken by hand. |
| 2 | completely set and easily broken with moderate effort |
| 3 | completely set and could just barely be broken by hand |
| 4 | completely set and could only be broken by first dropping from 61 cm., then could be further broken by hand |
| 5 | could not be broken by hand or by dropping |

Intermediate ratings are provided by using fractions. The data obtained is shown below in Table I wherein test results for monoammonium phosphate appear. The amount of additive is given as weight percent of the additive salt in the total composition. A rating of 1 or less is desired for practical application in commerce. In Table I, powder material was used except where indicated by "gran" and "crys" which indicate granular and crystalline material respectively.

TABLE I

| CAKING INHIBITOR | WT. PERCENT | CAKING SCORE |
|---|---|---|
| NONE |  | 3.00$^5$ |
| STP 110* | 0.3 | 0 |
| " | 0.2 | 0$^3$ |
| " | 0.1 | 0$^3$ |
| " | 0.05 | 0.25$^3$ |
| " | 0.025 | 1.00 |
| MSP | 0.2 | 0 |
| " | 0.1 | 0 |
| " | 0.05 | 0 |
| MSP-Gran | 0.2 | 0.33 |
| SAPP 28* | 0.3 | 0.50 |
| " | 0.2 | 0.50 |

TABLE I-continued

| CAKING INHIBITOR | WT. PERCENT | CAKING SCORE |
|---|---|---|
| " | 0.1 | 1.00 |
| " | 0.05 | 1.25 |
| " | 0.025 | 1.13 |
| STP 088* | 0.2 | 1.00$^1$ |
| STP.6H$_2$O | 0.2 | 0.00 |
| MSP.H$_2$O | 0.2 | 1.00 |
| DSP | 0.2 | 0.00 |
| DSP-Gran | 0.2 | 0.25$^1$ |
| TSP | 0.2 | 0.00 |
| TSP-Crys | 0.2 | 0.50 |
| TSP-Crys Gran | 0.2 | 1.50$^1$ |
| SHMP | 0.2 | 0.00 |
| TSPP | 0.2 | 0.25 |
| TSPP.10H$_2$O | 0.2 | 1.25 |
| Sodium Citrate | 0.2 | 0.50 |
| Sodium Sulfate | 0.2 | 1.00 |
| MKP | 0.2 | 4.00 |
| MKP | 0.1 | 2.88 |
| DKP | 0.1 | 1.75$^1$ |
| TKP | 0.1 | 2.75 |
| TKP | 0.05 | 2.50$^1$ |
| SKTP | 0.2 | 0.15$^3$ |
| SKTP | 0.1 | 0.75 |
| SKTP | 0.05 | 0.75 |
| KTP | 0.1 | 1.25 |
| KTP | 0.05 | 1.00$^1$ |
| TKPP | 0.02 | 1.38 |

*Numerical values are commercial grade designations of Monsanto Company, St. Louis, Mo.

In the above table the caking inhibitor identification is abbreviated for convenience and the following is the full description of the caking inhibitor tested.
STP sodium tripolyphosphate
MSP monosodium phosphate
SAPP sodium acid pyrophosphate
DSP disodium phosphate
TSP trisodium phosphate
SHMP sodium hexametaphosphate
TSPP tetrasodium pyrophosphate
MKP monopotassium phosphate
DKP dipotassium phosphate
TKP tripotassium phosphate
SKTP sodium potassium tripolyphosphate
KTP potassium tripolyphosphate
TKPP tetrapotassium pyrophosphate

EXAMPLE 2

The procedure of Example 1 was repeated with exception that diammonium phosphate was employed instead of monoammonium phosphate. The test results are reported in the same manner as above in Table II below wherein the abbreviations used are as noted above. As in Example I, caking inhibitor in powder form was employed except where noted.

TABLE II

| CAKING INHIBITOR | WT. PERCENT | CAKING SCORE |
|---|---|---|
| NONE |  | 3.88$^8$ |
| STP 110* | 0.3 | 0.00 |
| " | 0.2 | 0.38$^4$ |
| " | 0.1 | 0.75 |
| " | 0.05 | 1.00 |
| " | 0.025 | 1.75 |
| MSP | 0.2 | 0.15$^5$ |
| " | 0.1 | 0.06$^4$ |
| " | 0.05 | 0.75$^1$ |
| MSP-Gran | 0.2 | 0.33$^3$ |

TABLE II-continued

| CAKING INHIBITOR | WT. PERCENT | CAKING SCORE |
|---|---|---|
| " | 0.1 | 2.00[1] |
| " | 0.05 | 2.75[1] |
| SAPP 28* | 0.2 | 0.63 |
| " | 0.1 | 1.00 |
| " | 0.05 | 2.00 |
| STP 118* | 0.2 | 0.50 |
| STP 140* | 0.2 | 0.13 |
| STP 128* | 0.2 | 1.00 |
| STP.6H$_2$O | 0.2 | 0.25 |
| MSP.H$_2$O | 0.2 | 0.25 |
| DSP | 0.2 | 0.00[3] |
| " | 0.1 | 0.00[1] |
| TSP | 0.2 | 0.00 |
| TSP-Crys | 0.2 | 0.25 |
| SHMP | 0.2 | 0.38 |
| TSPP | 0.2 | 0.88 |
| TSPP.10H$_2$O | 0.2 | 2.00 |
| Sodium Citrate | 0.2 | 1.25 |
| Sodium Sulfate | 0.2 | 0.13 |
| Sodium-Gran | 0.2 | 1.63 |
| MKP | 0.2 | 2.38[4] |
| DKP | 0.2 | 2.50 |
| " | 0.1 | 2.50[1] |
| TKP | 0.2 | 2.75 |
| " | 0.1 | 2.88 |
| SKTP | 0.2 | 0.38 |
| " | 0.1 | 0.58[3] |
| " | 0.05 | 0.42[3] |
| KTP | 0.2 | 2.00 |
| " | 0.1 | 1.75 |
| TKPP | 0.2 | 1.75 |

*Monsanto's commercial grade designation

As can be seen from the above data, generally, the caking tendency of diammonium phosphate is greater than monoammonium phosphate as scores were lower in Example 1 than in Example 2. Furthermore, the sodium salt provided surprisingly improved results over the potassium salts. Also, powdered material provided superior results over other forms such as granular and crystalline forms.

The most advantageous caking inhibitors, from the data in Examples 1 and 2, appear to be mono-, di- and trisodium phosphate as well as sodium tripolyphosphate. Because of their water solubility and effectiveness at low concentrations the sodium orthophosphates and sodium tripolyphosphates are highly suited to provide caking inhibition of monoammonium phosphate and diammonium phosphate.

Although the invention has been described in terms of specific embodiments which are set forth in considerable detail, it should be understood that this description is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A composition comprising greater than 90%, by weight, monoammonium phosphate and a caking inhibiting amount of a phosphate selected from the group consisting of sodium tripolyphosphate, sodium potassium tripolyphosphate, sodium acid pyrophosphate, sodium pyrophosphate, sodium hexametaphosphate, trisodium phosphate, disodium phosphate and monosodium phosphate.

2. A composition comprising greater than 90%, by weight, diammonium phosphate and a caking inhibiting amount of a phosphate selected from the group consisting of sodium tripolyphosphate, sodium potassium tripolyphosphate, sodium acid pyrophosphate, sodium pyrophosphate, sodium hexametaphosphate, trisodium phosphate, disodium phosphate and monosodium phosphate.

3. The composition of claim 1 wherein the monoammonium phosphate is present in excess of 99%, by weight.

4. The composition of claim 3 wherein the amount of caking inhibiting phosphate is present in the range of from about 0.025% to about 0.3%, by weight.

5. The composition of claim 2 wherein the diammonium phosphate is present in excess of 99%, by weight.

6. The composition of claim 5 wherein the caking inhibiting phosphate is present in the range of from about 0.05% to about 0.3%. by weight.

7. The composition of claim 1 wherein the caking inhibiting phosphate is selected from the group consisting of mono-, di- and tri-sodium phosphate, said phosphate being in the powder form.

8. The composition of claim 7 wherein the phosphate is present in the range of from about 0.05% to about 0.2%, by weight.

9. The composition of claim 1 wherein the caking inhibiting phosphate is sodium tripolyphosphate.

10. The composition of claim 9 wherein the phosphate is present in the range of from about 0.025% to about 0.3%, by weight, said phosphate being in the powder form.

11. The composition of claim 2 wherein the caking inhibiting phosphate is selected from the group consisting of mono-, di- and trisodium phosphate.

12. The composition of claim 11 wherein the phosphate is present in the range of from about 0.05% to about 0.2%, by weight, said phosphate being in the powder form.

13. The composition of claim 2 wherein the caking inhibiting phosphate is sodium tripolyphosphate.

14. The composition of claim 13 wherein the phosphate is present in the range of from about 0.05% to about 0.3%, by weight, said phosphate being in the powder form.

15. A method of inhibiting the caking tendency of a compound selected from the group consisting of monoammonium phosphate and diammonium phosphate which comprises incorporating uniformly in said phosphates a caking inhibiting amount of at least one phosphate selected from the group consisting of sodium tripolyphosphate, sodium potassium tripolyphosphate, sodium acid pyrophosphate, sodium pyrophosphate, sodium hexametaphosphate, trisodium phosphate, disodium phosphate and monosodium phosphate.

16. The method of claim 15 wherein the phosphate is in the powder form.

17. The method of claim 16 wherein the phosphate is selected from the group consisting of mono-, di-, and trisodium phosphate.

18. The method of claim 16 wherein the phosphate is sodium tripolyphosphate.

19. The method of claim 15 wherein the phosphate is sodium potassium tripolyphosphate.

20. The method of claim 19 wherein the phosphate is present in the range of from about 0.05% to about 0.2%, by weight.

* * * * *

UNITED STATES PATENT AND TRADEMARK OFFICE
CERTIFICATE OF CORRECTION

PATENT NO. : 5,595,688

DATED : January 21, 1997

INVENTORS : Mark A. Adams et al.

It is certified that error appears in the above-identified patent and that said Letters Patent is hereby corrected as shown below:

ON TITLE PAGE

[56] References Cited

"as" should read --As--;
    "as" should read --As--;
    "Chem" should read --Chem.--.

[75] Inventors:

"R. Vass, Gibralter, Mich." should read --R. Vass, Gibraltar, Mich.--.

[57] ABSTRACT

"diammonium" should read --di-ammonium--;
    "are" should read --is--.

COLUMN 1

Line 8, "fertilizers fire proofing" should read --fertilizers, fireproofing--;
    Line 24, "material." should read --materials.--;
    Line 26, "to cake" should read --caking--;
    Line 32, "sorbital" should read --sorbitol--.

UNITED STATES PATENT AND TRADEMARK OFFICE
CERTIFICATE OF CORRECTION

PATENT NO. : 5,595,688

DATED : January 21, 1997

INVENTORS : Mark A. Adams et al.

Page 2 of 2

It is certified that error appears in the above-identified patent and that said Letters Patent is hereby corrected as shown below:

COLUMN 2

Line 3,   "moeity" should read --moiety--;
   Line 10,  "inhibitor" should read --inhibitors--.

COLUMN 3

Line 3,   "tumbler" should read --tumblers--;
   Line 34,  "some" should read --with some--;
   Line 35,  "hand." should read --hand--.

COLUMN 6

Line 15,   "0.3%." should read --0.3%,--.

Signed and Sealed this

Twelfth Day of August, 1997

Attest:

BRUCE LEHMAN

Attesting Officer

Commissioner of Patents and Trademarks